United States Patent Office

2,887,652
Patented May 19, 1959

2,887,652

APPARATUS FOR THE STUDY OF THE TRANSIENT PROPERTIES OF AN ELECTRIC TRANSMISSION CIRCUIT

Jacques Bendayan and Ivan Eyraud, Lyon, France, assignors to Compagnie Generale d'Electricite, Paris, France, a corporation of France Application July 8, 1954, Serial No. 442,114

Claims priority, application France July 30, 1953

4 Claims. (Cl. 324—57)

The present invention relates to an apparatus designed to make possible the study, by visual observation of the curves appearing on the fluorescent screen of a cathode ray oscilloscope, of certain properties of the electrical circuits, and more particularly, those circuits of this kind which have a finite propagation time, for example, transmission lines, or electrical networks simulating the properties of such lines.

As in other known systems, the method employed in the apparatus which is the object of the present invention consists of applying to the circuit to be studied, in the form of electric voltage, a signal of short duration, hereinafter called the "main signal," which is periodically repeated, in order to permit the visual observation on the screen of the oscilloscope, of which the electronic beam is influenced by electrical voltages known as "echo" voltages, developed on the same terminals to which the main signal voltage is applied, but after this signal itself has disappeared, said echo voltages being due to the reflections produced by the line or network being tested.

In known apparatus, usually termed "echometers," the echo voltages or quantities proportional to these are observed directly.

It is, however, well known that the practical importance of the reflected signal or of the echo voltage observed in this way, and particularly their relation with the interfering signals, which, at the receiving end of a transmission line, for example, follow in time the main signal propagated from the transmitting end through said line, are less well characterized by their magnitude and wave form, at this same transmitting end, as by a function termed "function of auto-correlation in relation to the time," associated with said echo voltage, which function will be better defined hereinafter.

The relations existing between these interference signals, the whole of which form what is sometimes designated by the name of "trailing signal," and said function of auto-correlation, and also the practical advantages of the method, which consists of making all the necessary observations on a transmission line at the transmitting end, are explained in an article by G. Fuchs entitled "Reflections in a Coaxial Cable Due to Impedance Irregularities" in the review "Proceedings of the Institution of Electrical Engineers," Part IV, vol. 99, 1952, pages 121–136.

If $t$ designates the time and $S(t)$ the electric voltage of the main signal applied to the circuit to be tested, and $R(t)$ the voltage of the reflected signal, the function of auto-correlation of the latter may be defined by:

$$F(\tau) = \frac{1}{T}\int_0^T R(t)R(t+\tau)\,dt$$

in which the quantity $\tau$ has the physical dimensions of a time to which may be given values varying from zero to T. According to the classical definition of a function of auto-correlation, T should be infinite, but in practice, it is sufficient to take T fairly large with respect to the duration or period of the phenomena studied. In practice it is generally assumed that T is chosen so that the effective duration of $S(t)$, i.e. the time during which $S(t)$ differs from zero, is small compared with T, and that the duration of the reflected signal $R(t)$, although it may be longer than that of $S(t)$ is less than T.

When, at a pair of terminals of a measuring system, the voltage $R(t)$ is available, it is possible to derive from this according to a known method, explained in particular in the above-mentioned article, the values of $F(t)$ corresponding to a signal of given type $S(t)$, by successively and periodically emitting first of all said signal $S(t)$, then the same signal retarded by a time $\tau$ in relation to the first, or possibly the latter signal with a polarity inversed in relation to the first, then by forming, by known electrical means, the algebraical square of said total reflected signal $(R(t)\pm R(t+\tau))^2$, eliminating from said square the terms $R^2(t)$ and $R^2(t+\tau)$ and by forming, by electrical means also well known, the algebraic mean during a period T of the double product $2R(t)R(t+\tau)$ appearing in said square. In order to show that it is possible to proceed in this way, it is sufficient to point out that the mean values of $R^2(t)$ and of $R^2(t+\tau)$ are independent, owing to the periodicity of the signals, of the parameter $\tau$, and therefore only provide constant terms, while the above-mentioned double product depends upon $\tau$. By successively giving this latter parameter different values, it is possible, point by point, to obtain the value of $F(\tau)$.

In this method, in which each value of $F(\tau)$ gives rise to an individual measurement, the representative curve of the function $F(\tau)$ can only be obtained by a point to point survey by making a measurement at each point. An apparatus for this purpose is described in particular in British Patent 679,408, entitled Improvements in or Relating to a Device for the Measurement of the Value of the Time Autocorrelation Function of the Voltage Developed Across an Electrical Impedance.

As the curve sought is frequently very irregular in shape, it is necessary, if sufficient precision is to be obtained, to record a very large number of points, which involves a considerable loss of time still further increased by the fact that the value of $F(\tau)$ for each point is deduced by calculation. Furthermore it is essential for the amplifiers intended to amplify the echo voltages to have an absolutely constant gain, because a variation of gain between two successive measuring operations would involve a considerable error.

The object of the present invention is a new device avoiding these drawbacks, and making it possible to observe directly on the screen of a cathode ray oscilloscope a curve of which the form and size represent $F(\tau)$ in consideration of the choice of suitable scales for the deviations of the electronic beam of the oscilloscope in two perpendicular directions hereinafter called for the sake of simplicity "horizontal" and "vertical." In this way a considerable gain of time is obtained in relation to the method mentioned of point by point survey.

Moreover, it will be seen in the following that the apparatus according to the invention makes it possible in certain cases, to obtain the values of $F(\tau)$ even if $S(t)$ is not a signal of short duration, but, for example, an electrical voltage having the wave shape called Heaviside's unit step, that is to say, to a function of time having the value zero for any instants prior to a reference instant chosen as origin of time and the value 1 for any period subsequent to said reference instant. Such a possibility exists in as much as the corresponding reflected signal $R(\tau)$ disappears in a sufficiently short time before T.

According to the present invention an apparatus is provided for studying the transient properties of an electric transmission circuit comprising a generator of recurrent electric pulse pairs of period $T_1$, a differential arrangement having a first pair of terminals to apply the voltage of said generator to said circuit, and a second pair of terminals to receive the electrical voltages reflected by said circuit, excluding the voltage coming direct from said generator of double signals, an electron-beam oscilloscope comprising deflection means to cause said beam to be deflected respectively in a first direction and a second direction substantially perpendicular to each other, means for amplifying said reflected voltages received on said second pair of terminals, means for amplifying said reflected voltages and applying them to a quadratic detector which, in an output circuit fed by said detector, supplies modified voltages substantially proportional to the square of the instantaneous amplitude of said reflected voltages, means for applying said modified voltages to an integrating and filtering network and means for applying the voltages filtered by said network to said deflection means, corresponding to said second direction of deflection, a generator of periodic scanning voltage of period equal to $T_1$ and the output voltage of which is applied to said deflection means corresponding to said first direction of deflection, this apparatus being characterised in this, that said generator of double recurrent electrical signals of period $T_1$ is formed of two generators of periodic signals of respective frequencies $f_1$ and $f_2$, such that the absolute value of the quantity $(f_1-f_2)$ be equal to $1/T_1$, and of which the output voltages are superposed in a mixer circuit feeding said differential arrangement.

The invention will be better understood from the following detailed description with reference to the attached drawings, in which.

Figure 1:
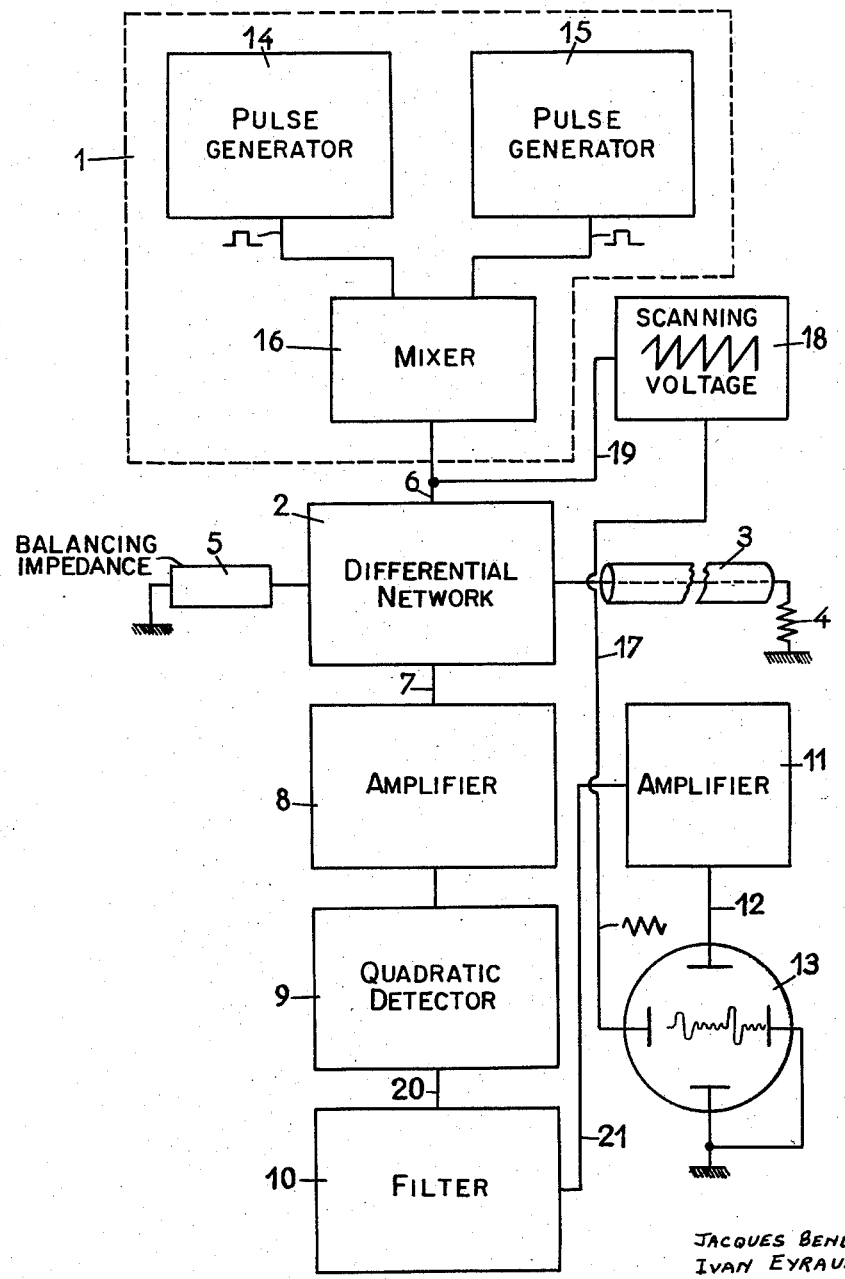
Fig. 1 represents, in a simplified manner, as a unifilar diagram, the overall schematic of a system according to the invention.

In Fig. 1, representing the whole of a system according to the invention, a generator 1 of double recurrent signals of period $T_1$ feeds a differential arrangement 2. The latter may, for example, be composed of a differential transformer or of a Wheatstone bridge. It is provided with four pairs of terminals, of which a first pair is to apply to said arrangement the voltage from 1 through the connection 6, a second pair connected to a connection 7 to receive the reflected signals to be studied, a third pair connecting said arrangement to the circuit 3 being tested, represented here in the form of a length of transmission line terminated without reflection by a suitable impedance 4, and a fourth pair of terminals connected to a balancing impedance 5, of which the value is so chosen that the signals coming from 1 and applied to 2 through the connection 6 do not transmit energy direct to the terminals connected to the connection 7. Such differential arrangements are well known and it is unnecessary to describe them in detail.

The signals received at 7, which are essentially the reflected signal or echo voltages mentioned above, are, if need be, amplified by an amplifier 8 of which the output feeds a quadratic detector 9, of which the output circuit itself is connected through the connection 20 to a low-pass filter 10, or, as will be seen later, to an integrating and filtering network of equivalent capacity and resistance, which may, if necessary, be followed by a low-pass filter.

The integrated signals filtered by 10, after amplification if necessary by an amplifier 11, are applied through the connection 12 to the deflecting plates in the vertical direction of the electronic beam of the oscilloscope 13.

As already mentioned, the generator 1 is composed of two simple generators 14 and 15 of impulses of respective repetition frequencies $f_1$ and $f_2$. The output circuits of 14 and 15 feed a mixer circuit 16, which is used to apply a composite signal to the connection 6, said mixer circuit 16, according to the particular case required, being either a simple connection of addition of the voltages coming from 14 and 15, or a more complicated device if it be desired to modify the shape of the signals coming from 15 and 16 before utilising them.

The horizontal displacement, with the period $$\frac{1}{f_1-f_2}$$

equal to $T_1$, of the beam of the oscilloscope 13, is ensured through the connection 17 by a generator 18 of scanning voltage of period $T_1$, for example, a generator of periodic saw-tooth voltage, which itself may be synchronised from the output of 1 by the connection 19 connected to 6.

The operation of the system is as follows:

The generators 14 and 15, for example emit pulses of short duration, of respective repetition frequencies $f_1$ and $f_2$ ($f_2$ for example being greater than $f_1$). The result is that 16 receives pairs of pulses, the two elements of which are in coincidence at certain recurrent periods with the period $T_1$, but in the course of such a period show with respect to each other a difference of time $\tau$ varying linearly in time. If, for example, the mixer 16 is a simple circuit of superposition of voltages, pulse pairs are found at 6 of which the spacing between their two elements varies linearly with the time. In synchronism with the variation of this spacing, the electronic beam of 13 is displaced horizontally by means of 17 and 18, so that, on the fluorescent screen of 13, the luminous point which is the track of said beam undergoes, from a fixed mark provided on said screen, a displacement proportional to $\tau$.

Furthermore, the signal received at 7 being, as already explained above equal or proportional, during each period of time T, to the sum $(R(t)+R(t+\tau))$ of the signals reflected by 3 respectively due to the spaced signals of the time interval $(\tau)$ coming from 1, the quadratic detector 9 forms on its output a current or voltage proportional to the square of this sum, if need be after amplification by the amplifier 8.

It is easy to see that the voltages of signals collected at 20 on the output of 9 comprise several components, two of which have constant values equal to the mean square of each of the quantities $R(t)$ and $R(t+\tau)$. It is easy to eliminate the latter subsequently by known means (for example by the amplifier 11 if, as is current practice, the latter is actuated in such a way as not to amplify the direct voltages). The components with very rapid variations contained in $R^2(t)$ and $R^2(t+\tau)$, terms of which the existence corresponds, when $S(t)$ and $S(t+\tau)$ are pulses of short duration or other signals with steep wave front, to those parts of $S(t)$ and $S(t+\tau)$ which also show rapid variations, are easily eliminated by the network 10, of which the upper limit frequency may be chosen for this purpose.

If said limit frequency of 10 (or the time constant of 10, if 10 is a simple integrator network) is chosen in such a way as to pass those signals of which the frequencies are of the order of $1/T_1$ and multiples of not too high an order of $1/T_1$, while eliminating the very high frequencies corresponding to the very rapid variations mentioned above, the filter 10 automatically supplies to its output a voltage proportional to the mean, during the time $T_1$, of the product $R(t)R(t+\tau)$, which is merely the value of the desired function of auto-correlation. The voltage thus obtained can then be amplified by 11 and applied by 12 to the deflecting plates acting on the vertical deviation of the beam of 13.

Thus a curve is finally obtained on the screen of 13 which represents the value of said function of auto-correlation as a function of $\tau$, which is the very result which is desired; it is, of course, possible to provide on the screen of 13 a scale graduated according to the values of $\tau$.

Various embodiments of the invention will now be described, more particularly adapted to particular types of signals $S(t)$.

Figure 2:
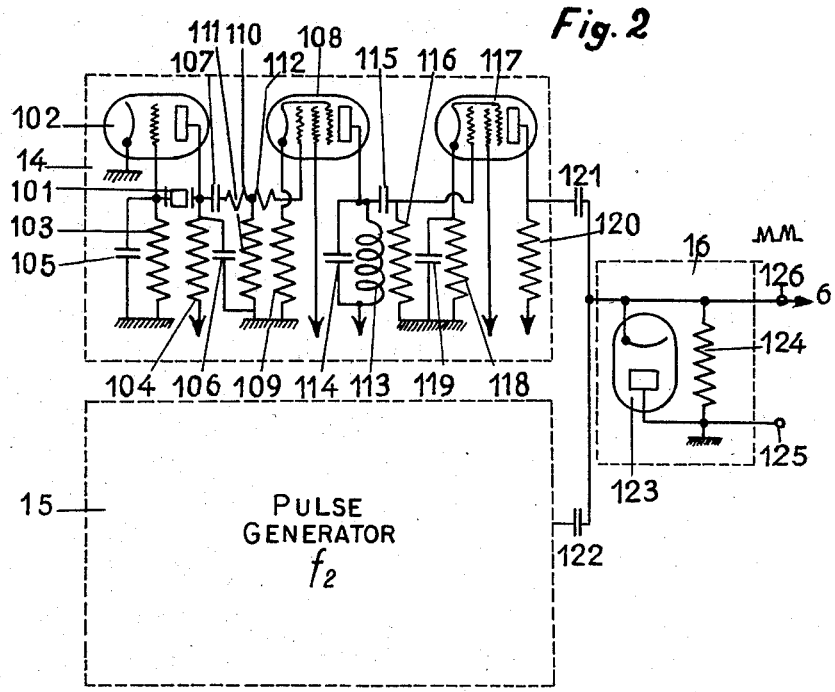
Figs. 2, 3, 4 and 5 represent particular embodiments, suitable to various types of desired signals, generators of double signals which can be used in the system according to the invention.

Fig. 2 represents an embodiment of a generator of pulse pairs of very short duration intended for use at 14, 15 in the diagram of Fig. 1. 14, for example, is composed of an oscillator comprising the piezo electric crystal 101, of natural frequency $f_1$, associated with the electronic tube 102 the impedance conditions necessary in the circuits of the control grid and the anode of 102 being obtained by means of the resistances 103 and 104 and the condensers 105 and 106 (the sources of supply of 102 are not shown for the sake of simplicity). The link condenser 107 transmits the voltage collected on the anode of 102 to the control grid of an amplifier tube 108, which, owing to the resistances 109, 110, 111, 112 acts as amplitude limiter through its grid current. The resonant circuit with inductance 113 and capacity 114 traversed by the anode current of 108 receives a pulse at each period of oscillation of 101, and the attenuated oscillating voltage collected on the terminals of 113, 114 is transmitted by the condenser 115 and the resistance 116 to a second amplifier tube 117, the control grid of which is suitably polarised in relation to the cathode by the resistance 118 shunted by the condenser 119. On the terminals of the resistance 120 inserted in the anode circuit of 117, a periodic voltage is collected, of frequency $f_1$, formed of pulses of very short duration.

The second generator 15 is constituted in a similar manner to 14. The voltages of pulses collected on the outputs of 14 and 15 are transmitted by condensers 121, 122 to the mixer circuit 16, which comprises a diode 123 which has the effect of rendering said pulses unipolar, and a utilisation resistance 124 on the terminals (125, 126) of which the voltage is collected which is to be applied to the connection 6 of Fig. 1.

Figure 3:
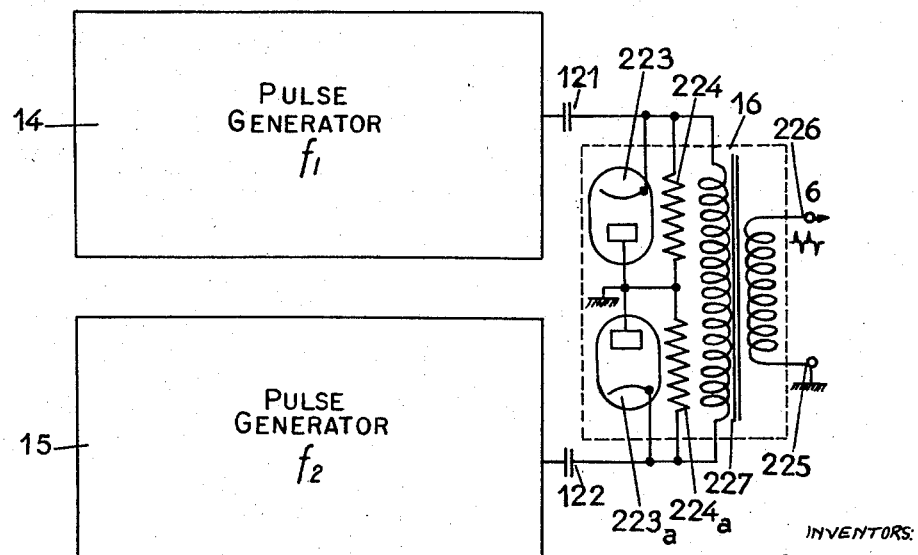

Fig. 3 represents a slightly different arrangement provided for the mixer circuit 16 when it is desired to obtain on the output of 1 pulse pairs of which the two elements have opposite polarities. In the case of Fig. 3 the condensers 121, 122 are respectively connected to diodes 223, 223a mounted with their directions of conductivity opposite to each other, and of which the output voltages, collected on the terminals of the resistances 224, 224a are combined by a transformer 227 and transmitted by the latter to the terminals 225, 226, forming the output terminals of the generator 1 of Fig. 1.

Figure 4:
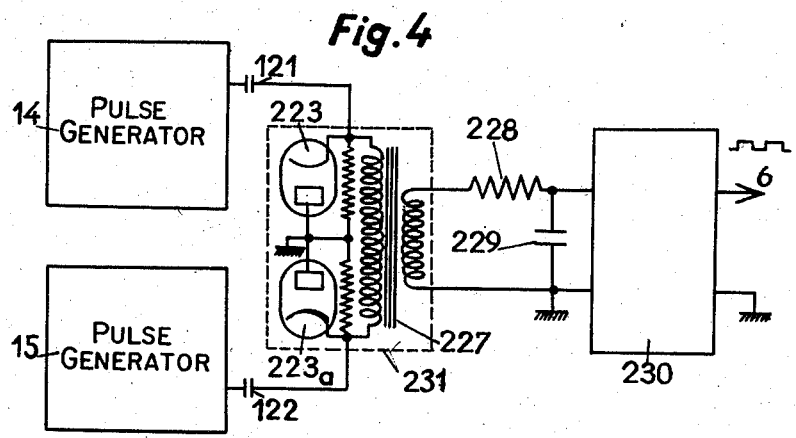
Figure 5:
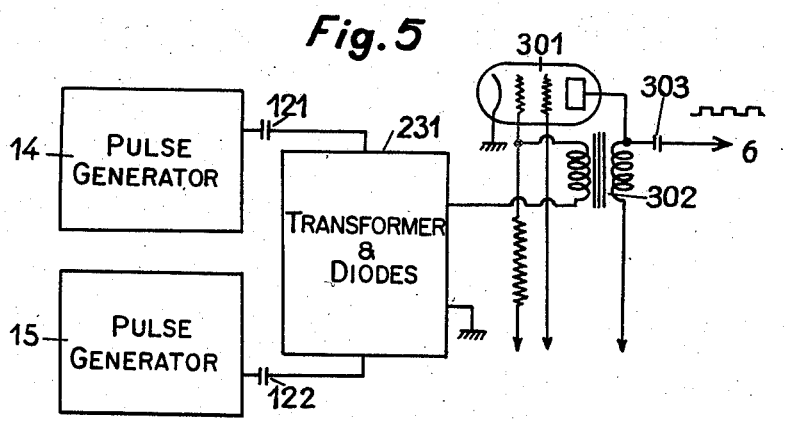

Figs. 4 and 5 represent embodiments of the generator 1 suitable for the case in which it is desired to study the transient behaviour of the circuit 3 being tested, for signals $S(t)$ of the type of the Heaviside unit step. It is obvious that the successive emission of two signals of this type having opposite polarities and of which the origins in time are spaced by an interval $\tau$, is perfectly simulated by that of signals of rectangular wave form and of duration equal to $\tau$. It is therefore only necessary for the generator 1 to produce such signals, of which the duration varies during the period $T_1$, from a minimum value practically zero to a higher maximum value given for $\tau$, which may be chosen, for example, equal to $T_1/2$.

Fig. 4 shows an embodiment of a generator of this kind. This generator comprises two generators 14 and 15 of pulses of very short duration and of respective repetition frequencies $f_1$ and $f_2$, as in the case of Fig. 3, and also a device 231 for superposition with inversion of polarity of the pulses produced, similar to that of Fig. 3. Therefore, between the terminals of the secondary winding of transformer 227, pulse pairs are obtained of spacing $\tau$ and opposite polarities, as in the case of Fig. 3. By subjecting these pulse pairs to the action of an integrator network formed of a resistance 228 and a condenser 229, the desired signals of rectangular wave-form are obtained, which can, if necessary, be subsequently amplified by an amplifier 230 before being applied to the connection 6 of Fig. 1.

Fig. 5 shows another embodiment of a generator supplying signals of rectangular wave form of the same type as in the case of Fig. 4. In the case of Fig. 5, the device 231 employed is similar to that of Fig. 4 as far as the terminals of the secondary winding of transformer 227. On the terminals of this winding pulse pairs are obtained, as explained hereinabove, of opposite polarities which, in the case of Fig. 5, are utilised in order to start or stop a blocking oscillator formed of the electronic tube 301 combined with the transformer 302 establishing a feed-back coupling between the control-grid and anode circuits of 301. On the anode of 301 the desired signals are transmitted by the condenser 303 to the connection 6 of Fig. 1.

Figure 6:
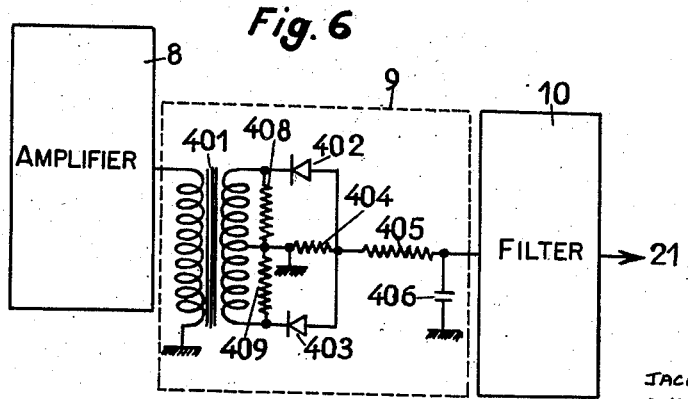
Fig. 6 represents an arrangement of quadratic detector and low-pass filter associated with the latter for use in the system according to the invention.

Fig. 6 shows an arrangement of quadratic detector and the integrating and filtering network applicable to the system of Fig. 1. In the diagram of Fig. 6, the output of the amplifier 8 feeds the primary winding of a transformer 401, of which the secondary winding is symmetrical in relation to earth and discharges on two rectifiers 402, 403, which are used in the parabolic part of their current-voltage characteristic. For this purpose the circuit formed by the secondary winding of 401 and by 402 and 403 feeds a resistance 404 of low value, the value of which must be chosen very small in comparison with the apparent resistance of the whole (401, 402, 403). To fulfil this condition better, the two secondary half-windings of 401 are preferably shunted by auxiliary resistances 408, 409. An integrating network formed by the resistance 405 and the condenser 406 supplies to the terminals of the latter a voltage substantially proportional to the integral of time of the voltage on the terminals of 404, which itself is proportional to the square of the amplitude of the output voltage of 8. A low-pass filter 10 can be added to eliminate any high frequency components which might still exist in the voltage on the terminals of 406, and then transmit them to the connection 21 of Fig. 1.

The choice of the frequencies and time constants of the system may be defined as follows:

If $\theta$ is the maximum delay time to be considered for the signals reflected by the circuit 3 in relation to those applied to 3 by the generator 1 through 6 and 2 (Fig. 1) (for example if 3 is a transmission line of length $l$ and of speed of propagation $v$) $\theta$ will be taken as equal to $2l/v$, the maximum values to be considered in practice for $\tau$ being of the order of $\theta$. $f_1$ and $f_2$ will be chosen in such a way that T is at least equal to $\theta$. Moreover, the two frequencies $f_1$ and $f_2$ must be so chosen that the highest of these frequencies remains less than $$\frac{1}{2\theta}$$

so as to avoid an overlapping of the reflected signals corresponding to two consecutive pulses emitted by the generator.

The time constant of the integrating and filtering network 10 must be chosen clearly less than the period T, so as to permit good reproduction of the details of the curve observed on the screen of the oscilloscope 13. In practice, it would, for example, be possible to take for this time constant, the highest possible value compatible with this last condition, because it is well known that an electrical integrator is all the more perfect the higher its constant. The integration time-constant must, of course, be chosen rather large, in order to eliminate on the output of the integration network, the signals of which the frequency is of the order of $f_1$ or $f_2$, and a fortiori, the higher harmonics of said frequencies.

In a practical application, relating to a transmission line of which the send and return propagation time was 2 microseconds, $f_1 = 100,000$ c./s.; $f_2 = 99.975$ c./s. has been chosen, giving the integrator network a time constant of 4 microseconds and associating with it a low-pass filter having an upper frequency limit of 80.000 c./s.

What is claimed is:
1. Apparatus for the study of the transient properties of an electric transmission circuit, comprising, in combination, a first and a second generator of periodic pulses of respective frequencies $f_1$ and $f_2$; a mixing network connected to the outputs of said generators; a low-pass filter having an input and an output terminal; a series-combination comprising an amplifier and a quadratic detector, the latter being connected to said input of said low-pass filter; a differential network having a first pair of terminals connected to the output of said mixing network, a second pair of terminals connected to said amplifier, a third pair of terminals connected to the transmission circuit to be tested, and a fourth pair of terminals connected to a reference network; a cathode ray oscilloscope having a first pair of deflecting plates connected to the output of said low-pass filter, and a second pair of deflecting plates; and a saw-tooth voltage generator connected to said second pair of deflecting plates and synchronized by the output of said mixing network.

2. Apparatus as claimed in claim 1, wherein each of said first and second generators is a generator of short duration periodic pulses and wherein said mixer circuit is so arranged as to deliver pulse pairs, each pulse of which has the same polarity.

3. Apparatus as claimed in claim 1, wherein each of said first and second generators is a generator of short duration periodic pulses and wherein said mixer circuit is so arranged as to deliver pulse pairs, respective pulses of which have opposite polarities.

4. Apparatus as claimed in claim 1, wherein each of said first and second generators is a generator of periodic pulses of substantially rectangular wave shape and wherein said mixer circuit is so arranged as to deliver pulse pairs, respective pulses of which have opposite polarities.

References Cited in the file of this patent

UNITED STATES PATENTS

| | | |
|---|---|---|
| 2,253,975 | Guanella | Aug. 26, 1941 |
| 2,499,001 | Green | Feb. 28, 1950 |
| 2,522,362 | Gilbert | Sept. 12, 1950 |
| 2,800,627 | Oudin et al. | July 23, 1957 |